United States Patent [19]
Gerber

[11] 3,732,764
[45] May 15, 1973

[54] APPARATUS AND METHOD FOR CUTTING SHEET MATERIAL WITH CHOPPING TYPE BLADE MOTION

[75] Inventor: Heinz Joseph Gerber, West Hartford, Conn.

[73] Assignee: Gerber Government Technology, Inc., East Hartford, Conn.

[22] Filed: Mar. 1, 1971

[21] Appl. No.: 119,792

[52] U.S. Cl. ............................ 83/34, 83/49, 83/56, 83/71, 83/556, 83/926 CC
[51] Int. Cl. ............................ B26d 1/00, B26d 5/30
[58] Field of Search ............... 83/49, 56, 926 CC, 83/71, 427, 428, 556, 561, 648, 658, 34

[56] References Cited

UNITED STATES PATENTS

| 3,555,949 | 1/1971 | Treff | 83/561 X |
| 1,585,012 | 5/1926 | Biersdorf | 83/925 CC |
| 3,522,753 | 8/1970 | Schmied | 83/71 X |
| 245,150 | 8/1881 | Fowler | 83/658 |
| 3,626,799 | 12/1971 | Gerber et al. | 83/925 CC X |

*Primary Examiner*—Andrew R. Juhasz
*Assistant Examiner*—James F. Coan
*Attorney*—McCormick, Paulding & Huber

[57] ABSTRACT

An apparatus and associated method for cutting sheet material spread in one or more layers over a supporting surface uses a reciprocating cutting tool cutter movable in two coordinate directions in the plane of the supporting surface to enable the cutting tool to follow a desired line of cut relative to the sheet material. The cutting tool has, at its lower end, a generally downwardly facing sharpened edge, and the stroke of the cutting tool is such that during a portion of each cycle of reciprocation it is located entirely out of the material being cut. During such portion of its cycle of reciprocation it is moved forwardly along the desired line of cut a substantial distance so that during its following downward movement through the material it encounters a substantial length of uncut material which is pressed between the sharpened lower end of the tool and the supporting surface so as to cut the material with a chopping action. The supporting surface is formed by a material which is penetrable by the lower end portion of the cutting tool, and at the lower limit of its reciprocation the lower end of the cutting tool does penetrate the supporting surface to assure cutting of the sheet material through its full vertical thickness.

12 Claims, 10 Drawing Figures

INVENTOR.
HEINZ JOSEPH GERBER

3,732,764

APPARATUS AND METHOD FOR CUTTING SHEET MATERIAL WITH CHOPPING TYPE BLADE MOTION

BACKGROUND OF THE INVENTION

This invention relates to an apparatus for cutting sheet material, such as garment or upholstery fabrics, and deals more particularly with such an apparatus and method utilizing a cutter with a reciprocating cutting tool.

The type of apparatus and method with which this invention is concerned is one which may be used for cutting garment or upholstery components or the like from either a layup of sheets arranged in vertically stacked relationship or from a single sheet which is spread out in a generally flat condition prior to the cutting operation. The supporting surface for the sheet material is arranged generally horizontally and the cutter is supported for movement above the surface of the supported sheet material and in two coordinate directions relative to the supporting surface so as to enable its cutting tool to be moved along any desired line of cut on the sheet material. As the cutter is moved along the desired line of cut its cutting tool engages the sheet material and is reciprocated to execute the actual cutting function.

In the past it has been common to cut spread sheet material with a reciprocating tool type of cutter and when using such a cutter it has also been common to operate the tool or blade in such a manner that it cuts with a slicing type action. That is, it has been common for the cutting tool to have a forward cutting edge parallel to the axis of reciprocation and for the actual cutting of the fabric to be effected by this forward cutting edge, the forward cutting edge being moved in its reciprocation perpendicularly to the plane of the sheet material and being urged forwardly into the material by the general forward motion of the cutter along the desired line of cut. This slicing type of cutting action has several disadvantages. First, the cutting tool in cutting the sheet material pushes forwardly against the material and tends to displace the material relative to the supporting surface causing wrinkles and waves in the material and causing the blade to deviate from the desired line of cut, particularly in the case of automatically controlled cutters. Also, the cutting tool is normally reciprocated by the cutter in a simple harmonic motion and accordingly at the top and bottom of each stroke passes through a phase at which little or no vertical movement of the blade takes place, the blade being merely pushed forwardly against the sheet material with no slicing action. To minimize this the cutting tool may be reciprocated at a very high rate of reciprocation in comparison to its feed rate along the line of cut, but this high rate of reciprocation causes increased friction between the blade and the material being cut which in the case of some materials, such as plastic sheets or sheets including plastic fibers, produces heat which may be excessive and which may cause the sheets to melt adjacent the edge of the cut and thereafter fuse to one another. Still further, in the case of some types of fabrics a slicing type of cut does not provide a smooth clean cut but instead tends to produce ragged edges and loose fibers.

The general object of this invention is to provide a reciprocating fabric cutter which eliminates the aforementioned problems of previous reciprocating cutters.

In substance, this object is achieved by providing the cutting tool with a generally downwardly facing cutting edge and by so constructing the means for reciprocating the cutter and the means for feeding it along the line of cut that a substantial portion of the actual cutting operation is accomplished by means of a chopping type action wherein the lower downwardly facing edge of the blade passes downwardly through the sheet material and presses a previously uncut portion of the material between such lower edge and the supporting surface. One benefit achieved by this chopping motion of the blade is that it releases strains on the blade that might otherwise develop as a result of its cutting action. That is, during each of its strokes the blade is pulled completely out of the material being cut for some short amount of time and while it is so removed from the material any deflection of the blade caused by forces imposed thereon by the material are removed and the blade may return to its normal undeflected state before again entering the material. This allows the blade to more faithfully follow the desired line of cut through the full thickness of the material being cut and reduces cutting errors arising from blade deflection.

SUMMARY OF THE INVENTION

This invention resides in an apparatus for cutting sheet material which apparatus includes a cutter having a reciprocating cutting tool and which is movable relative to a supporting surface on which sheet material to be cut is spread to enable it to move along a desired line of cut. The cutting tool is oriented generally perpendicularly to the cutting surface and extends downwardly from the main body of the cutter toward the supporting surface. The cutting tool includes a forward cutting edge and, at its lower end, a generally downwardly facing cutting edge. A means is provided for simultaneously reciprocating the cutting tool and for moving it generally along the desired line of cut. This means includes a cyclically operable means for first moving the cutting tool downwardly through the sheet material, for then retracting it to a point above the top surface of the sheet material and for then moving it forwardly along the desired line of cut a substantial distance before it is again moved downwardly through the sheet material whereby the lower end of the blade throughout each downward passage through the sheet material encounters a previously uncut portion of the material and cuts it in a chopping fashion by pressing it between the lower sharpened edge of the blade and the supporting surface. The supporting surface is penetrable by the lower end of the cutting tool and at its lower limit of movement the blade does penetrate the supporting surface to assure cutting of the full vertical thickness of the material. The generally downwardly facing cutting edge may be inclined generally upwardly and forwardly or upwardly and rearwardly to define either a forward point or a rearward point on the blade for cutting different types of materials. The forward movement of the blade along the line of cut while the blade is out of contact with the sheet material may be obtained by making the stroke of the blade quite large relative to the thickness of the sheet material so the blade is out of contact with the sheet material during a major portion of each stroke. It may also be obtained by controlling the positioning means for the cutter in response to the position of the blade along its stroke so that the positioning means are active only when the blade is out of the sheet material. It may also be accomplished by reciprocating the blade in an orbital or similar type of path whereby during its downstroke it moves along a path located forwardly of the path followed during its upstroke.

The invention also resides in the associated method for cutting sheet material with a chopping type of a blade motion.

DETAILED DESCRIPTION OF THE PREFERRED EMBODIMENTS

Figure 1:
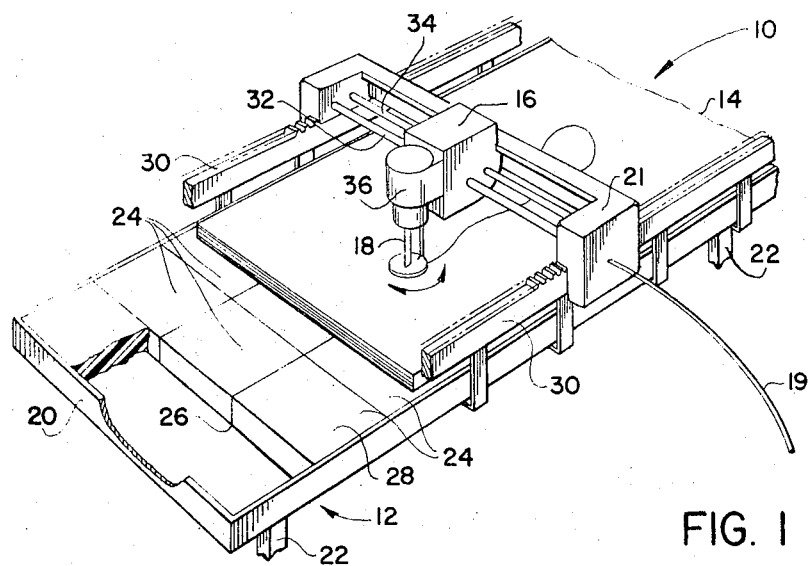
FIG. 1 is a fragmentary perspective view of a sheet material cutting apparatus embodying the present invention.
Figure 2:
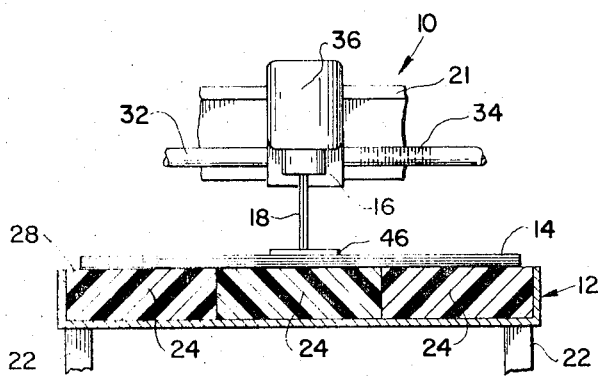
FIG. 2 is a somewhat enlarged fragmentary sectional view taken along the line 2—2 of FIG. 1.

Turning now to the drawings in greater detail, and first considering FIGS. 1 and 2, a sheet material or fabric cutting apparatus 10 is shown to include a table, indicated generally at 12, providing support for a fabric layup 14 comprising a plurality of fabric sheets arranged in vertically stacked relation. A carriage 16 is supported by the table for traversing the surface thereof in two coordinate directions as indicated by the arrows X and Y. The apparatus also includes a cutter 36, having a cutting tool in the form of a blade 18, mounted on the carriage 16 so that it can be driven to and from any predetermined point relative to the table surface in response to positioning signals supplied to the apparatus through the cable 19 by an associated input means such as, for example, a numerically controlled controller or a computer, not shown in FIG. 1. The carriage 16 is capable of moving the blade 18 in cutting engagement with the layup 14 along any line which may be straight or curved as required in cutting a garment component or the like. The blade 18 has a reciprocating cutting stroke and is further arranged for rotation about its own axis in a direction indicated by the arrow θ in response to signals from the input means. During the lower portion of its stroke, the blade 18 penetrates the supporting surface 28 of the table 12 as hereinafter described in more detail.

The cutting table 12 may be constructed from various materials and may take a variety of forms, and in the illustrated case includes a container-like frame 20 supported at a convenient working height by a plurality of legs 22, 22. The frame has a bottom wall and side and end walls which extend upwardly from the bottom wall to form a shallow container for receiving a plurality of generally rectangular blocks 24, 24 of resilient penetrable plastic material contiguously arranged relative to one another to form a bed of material indicated generally at 26. Preferably the blocks are made from foamed polyethylene. Ethafoam, a product of Dow Chemical Company, has proven particularly suitable as a bed material. The upper surfaces of the blocks 24, 24 collectively define the generally horizontal upwardly facing supporting surface 28 on which the layup 14 is supported. Another form of bed material which has been found to provide very satisfactory results is a plurality of closely packed vertically oriented bristles having their lower ends fixed to a supporting member and having their upper ends located in a common plane and defining the penetrable supporting surface.

The carriage 16 may be supported and driven relative to the table in various different ways without departing from the invention. In the illustrated apparatus of FIG. 1, however, the carriage 16 is carried by a larger main carriage 21 which transversely pans the table 12. Support for the main carriage 21 is provided by a pair of elongated racks 30, 30 mounted on opposite sides of the table and extending longitudinal thereof. The carriage 21 includes a drive shaft (not shown) which also extends transversely of the table and has pinions mounted at its opposite ends for engaging the racks 30, 30 to move the carriage longitudinally of the table, or in the illustrated X direction, in response to operation of a drive motor drivingly connected to the shaft. A guide bar or tube 32 and a lead screw 34 also extend transversely of the table and serve to support and drive the carriage 16 transversely of the table, or in the illustrated Y direction, in response to the operation of another drive motor drivingly connected with the lead screw 34. The blade 18 extends downwardly from the main body of the cutter 36 and is reciprocated vertically in substantially simple harmonic motion by a motor in the cutter body. It is also rotated in the θ direction by another motor in the cutter body.

The blade 18 may also be raised in a fundamental manner relative to the supporting surface 28 to raise it from its normal cutting position to a position at which it is located entirely out of and above the top of the fabric layup 14 throughout the full cycle of its reciprocating movement. That is, when the blade 18 is raised its lower end is positioned at all times above the layup 14 so that it may, if desired, by moved to any preselected position above the layup and then lowered to pierce the layup, and in this manner a cut may be started at any desired position of the layup and inwardly of the marginal edges thereof. This raising and lowering of the blade 18 in a fundamental manner may be provided for by mounting the cutter 36 on to the carriage 16 for vertical movement relative thereto, and the carriage 16 may include a suitable motor for effecting such raising and lowering movement.

Figures 3, 5:
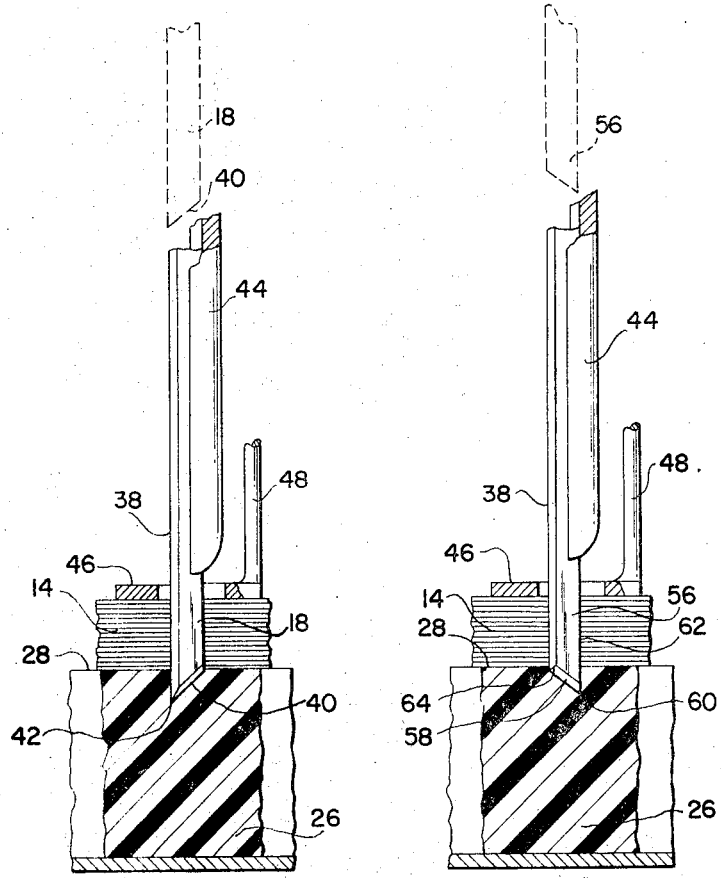
FIG. 3 is a fragmentary side elevational view of the blade of the cutting apparatus of FIG. 1.
FIG. 5 is a side elevational view generally similar to FIG. 3 but showing another type of blade which may be used with the cutting apparatus of FIG. 1 in place of the blade shown in FIG. 3.

Referring to FIGS. 2 and 3, the cutter blade 18 is vertically elongated and includes a sharpened forward edge 38. At its lower end it includes a generally downwardly facing sharpened cutting edge 40 which extends generally upwardly and rearwardly from the forward edge 38 so as to define a point 42 located in line with the forward edge 38. Because the point 42 is located at the forward edge of the blade this blade is therefore referred to as a "forward point" blade. Above the top surface of the layup 14 the blade 18 is partially received in a sheath 44 which is fixed to the remainder of the cutter 36 and which rotates about the θ axis in unison with the blade, the sheath serving to guide the blade in its reciprocating movement and to react some of the rearwardly directed forces exerted on the blade by the material being cut.

The cutter 36, as shown in FIGS. 1, 2 and 3, also includes a presser foot 46 which during a cutting operation engages the top surface of the layup 14 and through which the cutter blade 18 extends. The presser foot 46 is fixed to the main body of the cutter 36 by an arm 48 and moves longitudinally and transversely relative to the supporting surface 28 with the cutter 36 but does not rotate with the blade 18 about the vertical θ axis. The presser foot 46 serves to hold the material of the layup 14 in place on the cutting surface 28 in the cutting zone of the blade 18, and in particular prevents the material of the layup from moving upwardly with the blade 18 during the upstroke of its reciprocating movement. The presser foot 46 is not, however, by itself, a part of this invention, and if desired other means may be used in place of or in addition to the presser foot for holding the material in place. One such alternative means is, for example, a vacuum holddown system as illustrated and described in U. S. Pat. No. 3,495,492.

The cutter 36 includes a motor for reciprocating the blade 18 along a vertical axis of reciprocation arranged generally perpendicular to the supporting surface 28, and in accordance with this invention the length of the stroke is substantially greater than the vertical thickness of the layup 14. Preferably, the length of the stroke is greater than twice the vertical thickness of the layup 14, and still more preferably is three or more times greater than the thickness of the layup. Since the height of the layup may vary from one layup to another the stroke of the cutter blade is preferably selected or designed in terms of the maximum height of layup to be cut by the apparatus. That is, the cutter blade stroke should be of such length as to be two or more times greater than the thickness of the maximum thickness layup to be cut by the apparatus. In FIG. 3, the solid lines show the blade 18 in the lowermost extent of its reciprocating movement and the broken lines illustrate it in the uppermost extent of its reciprocating movement. In this particular case it will be noted that the length of the stroke is somewhat more than three times greater than the vertical height of the illustrated layup 14.

The motor and associated mechanism of the cutter 36 for reciprocating the blade 18 are or may be of generally conventional construction and move the blade in substantially simple harmonic motion. Likewise, the motors for driving the carriages 21 and 16 in the X and Y coordinate directions to move the cutter 36 along a desired line of cut, and the associated control system are, or may be, of generally conventional construction and operate to move the cutter 36 in a substantially continuous fashion in the plane of the supporting surface 28 during a cutting operation.

Figure 4:
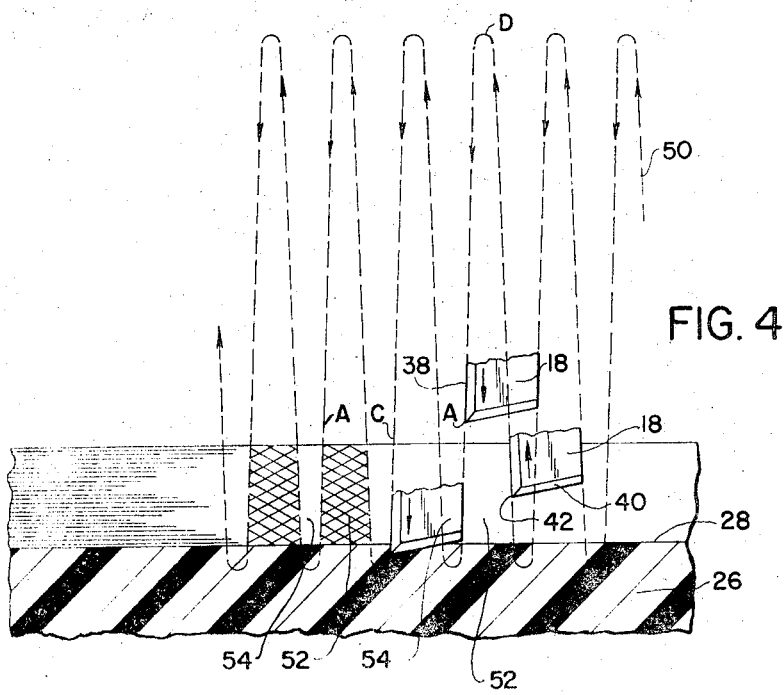
FIG. 4 is a fragmentary sectional view showing the path of motion of the blade of the cutting apparatus of FIG. 1 as it moves through several cycles of its reciprocating movement.

The reciprocating movement of the blade and its forward movement along the desired line of cut are carried out simultaneously, and the net result of this simultaneous reciprocation and forward movement is shown by FIG. 4 wherein the broken line 50 represents the path of the point 42 of the blade 18 as it moves through several cycles of reciprocation throughout a cutting operation. From this figure, it will be observed that the path 50 of the point 42 is essentially a sine wave and that throughout the major portion of its reciprocating movement, the point 42 is located above the top surface of the layup. As a result of this, the blade 18, while it is out of contact with the layup 14 moves forwardly along the line of cut by a distance which is substantially greater than the distance by which is moves forwardly while in cutting engagement with the layup, and as a further consequence of this, the downwardly facing edge 40 of the blade during each downward stroke of the blade encounters and cuts with a chopping action a substantial previously uncut portion of the layup. This may be better understood by considering the movement of the blade 18 through one cycle of reciprocation, as follows.

Starting at the point A, located slightly above the top surface of the layup 14, the blade 18 first moves downwardly to its lowermost position B. Throughout this movement from point A to point B the downwardly facing edge 40 engages a previously uncut layup portion 52, indicated by crosshatching in FIG. 4, and cuts the material of this portion 52 in a chopping action by pressing it between the edge 40 and the supporting surface 28. From the point B the blade 18 moves upwardly to the point C at which it is again located out of contact with the layup 14. In its movement from the point B to the point C, the forward edge 38 of the blade cuts the fabric of the layup with a slicing action, the portion of the layup cut by such slicing action being indicated at 54. From the point C the blade is moved upwardly to its uppermost limit D and then downwardly to the next point A of the following cycle, and the process is cyclically repeated. During the time that the blade moves from the point C to the point D to the point A, it is moved a substantial distance forwardly along the desired line of cut so that as it again moves downwardly from the new point A it again encounters a substantial length of previously uncut material. Therefore, although some small amount of slicing action takes place as the blade is moved upwardly through the layup from its lowermost position, represented by the point B, the chopping action which takes place on the downward movement of the blade constitutes the major portion of the overall cutting process.

It should also be noted from FIG. 4 that the width of the blade 18 from its front to its rear edge and the distance by which the point 42 penetrates below the supporting surface 28 are so selected that when the blade reaches its lowermost position the edge 40 extends rearwardly some distance beyond, and is located below the entirety of the just cut portion 52 to assure that the full extent of such portion is cut during each downward blade movement.

Figure 6:
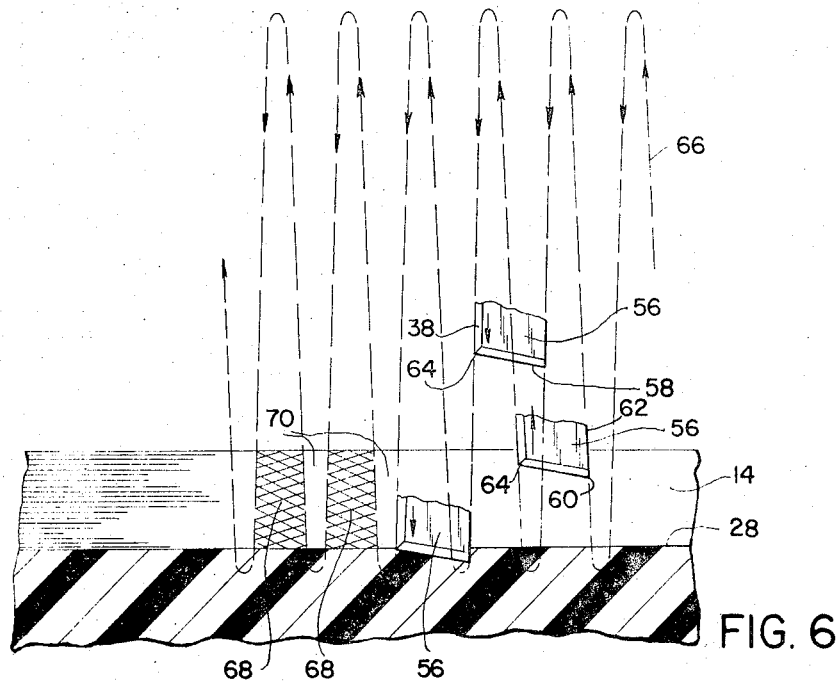
FIG. 6 is a sectional view similar to FIG. 4 but showing the blade of FIG. 5 rather than the blade of FIG. 3.

The forward point blade 18 of FIGS. 1 to 4, has been found to be particularly well adapted for the cutting of sheets of plastic, such as polyvinylchloride, or other composite materials made up largely of plastic and minor amounts of fibrous material. In cases when the material to be cut consists of sheets made up entirely or largely of fibrous material, such as most clothing and upholstery material, it has usually been found that a cleaner and more desirable cut may be had by using a "rear point" blade such as shown in FIGS. 5 and 6. Referring to these figures, the blade there shown is indicated at 56 and may be directly substituted for the blade 18 in the apparatus 10 of FIGS. 1 and 2. The blade 56 is or may be identical with the blade 18 except for including, at its lower end, a generally downwardly facing cutting edge 58 which is inclined downwardly and rearwardly from the forward cutting edge 38 so as to form a point 60 located in line with the rear edge 62 of the blade. In FIG. 5, the solid lines show the blade 56 in the lowermost extent of its reciprocating movement and the broken lines 56 show it in the uppermost extent of its reciprocating movement. The point at which the downwardly facing edge 58 intersects the forward edge 38 is indicated at 64 in FIGS. 5 and 6.

FIG. 6 is generally similar to FIG. 4 and shows by the broken line 66 the movement of the point 64 of the blade 56 as it moves through several cycles of reciprocation during a normal cutting operation. From this figure, it will be understood by inspection that during each downward movement of the blade a previously uncut portion 68 of the layup 14 is cut with a chopping action by the generally downwardly facing edge 58, the portions so cut being indicated at 68, 68. The portions indicated at 70, 70 are portions which are cut with a slicing action by the forward edge 38 of the blade during each upward stroke thereof. The portions 68, 68 are much larger than the portions 70, 70 and it will therefore be clear from FIG. 6 that as the blade is moved along the line of cut a major portion of the actual cutting is accomplished by the chopping action. It should also be noted in comparing FIGS. 4 and 6 that with the rear tipped blade of FIG. 6 the blade, at its forward edge need not penetrate beyond the supporting surface for as great a distance as must the blade 18 of FIG. 4 in order to assure the complete cutting of each portion 68. Therefore, for a given blade stroke, the rear point blade of FIG. 6 allows a slightly greater portion of each cycle of reciprocation to occur with the blade out of cutting engagement with the layup 14 so that during each downward movement of the blade a slightly greater amount of material may be cut with a hopping action as compared to the forward point blade of FIG. 4.

Of course, it should be understood that the forward point blade of FIGS. 1 to 4 and the rear point blade of FIGS. 5 and 6 are not the only type of blades usable in practicing this invention, and instead the lower end of the blade may take various different other shapes. For example, the lower end of the blade could be designed with the point located between the front and rear edges of the blade with the generally downwardly facing cutting edge including one edge portion extending upwardly and forwardly from the point and another edge portion extending upwardly and rearwardly from the point. Also, the generally downwardly facing edge could be an edge arranged substantially horizontal and perpendicular to the front and rear edges of the blade.

In the foregoing examples of this invention, the substantial forward movement of the cutting tool along the desired line of cut while it is out of engagement with the layup so as to engage a substantial amount of previously uncut material on its next downward stroke has been accomplished by utilizing a cutting tool stroke which is large in comparison to the thickness of the material being cut and by holding the cutter at such a vertical level during the cutting operation that the cutting tool is out of contact with the material being cut during a major portion of its stroke. If desired, however, and in keeping with the broader aspects of this invention, other means may be employed for simultaneously reciprocating and moving forwardly the blade to obtain a cutting of the layup which is predominantly of a chopping type action. One such alternate way of obtaining this motion is illustrated in FIG. 7 which is a block diagram illustration of a system embodying the invention.

Figure 7:
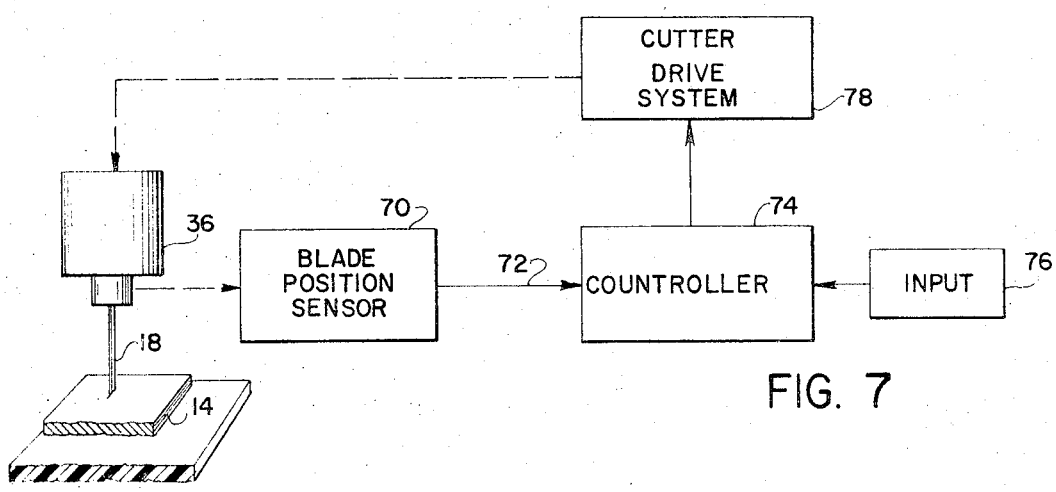
FIG. 7 is a schematic block diagram illustrating the control system for a reciprocating cutter comprising another embodiment of this invention.

Referring to FIG. 7, a cutter is illustrated at 36 and includes a reciprocating cutting tool 18. This cutter and tool may be similar to that shown in FIGS. 1 and 2, and the means for supporting and driving it relative to a supporting surface may also be similar to that shown in FIGS. 1 and 2. Associated with the cutter 36 of FIG. 7 is a blade position sensor 70 which senses the instantaneous position of the blade 18 along its path of reciprocation, and produces output signals representative of the blade position which are supplied by the line 72 to the illustrated controller 74. The controller 74 is responsive to input signals from an input device 76, such as a magnetic tape reader, for supplying signals to the cutter drive system, represented at 78, for causing the cutter 36 to be driven along a desired line of cut. The controller 74 is additionally responsive to the input from the blade position sensor 70 to modify or control the transmission of output signals from the controller 74 to the cutter drive system 78 in such a manner that the cutter drive system 78 is operated to move the cutting tool 18 along the desired line of cut in such a fashion that the major portion of such movement occurs when the blade 18 is out of contact with the layup 14. This modification or control of the signals supplied to the cutter drive system 78 is preferably such that drive signals are supplied to the cutter drive system 78 only during those periods of time at which the blade is located out of contact with the layup 14. However, the modification or control could also be such that the cutting tool 18 is moved forwardly at a relatively slow rate while it is in cutting engagement with the layup and is moved forwardly at a much faster rate while out of engagement with the layup.

Figure 8:
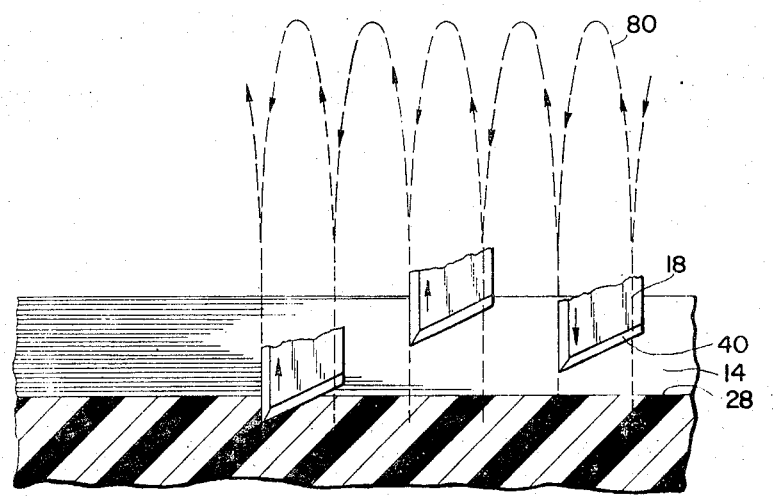
FIG. 8 is a fragmentary sectional view showing the path of movement of a cutter blade of the system of FIG. 7 as it moves through several cycles of its reciprocation.

FIG. 8 is a similar to FIG. 4 and shows, by the broken line 80, the path of movement of the cutting tool 18 of FIG. 7 in the case where the controller 74 is adapted to modify the drive signals supplied to the cutter drive system 78 in such a manner that no drive signals are supplied to the drive system while the cutting tool is in engagement with the layup 14. From FIG. 8, it will be understood that during each downward movement of the blade 18 through the layup 14 and during each subsequent upward movement of the blade through the layup 14, it moves along a straight path perpendicular to the supporting surface 28. As a result, no cutting by slicing action takes place and all of the cutting is effected by a chopping type action wherein the lower blade edge 40 during the downward movement of the blade presses the uncut material between it and the supporting surface 28.

Figure 9:
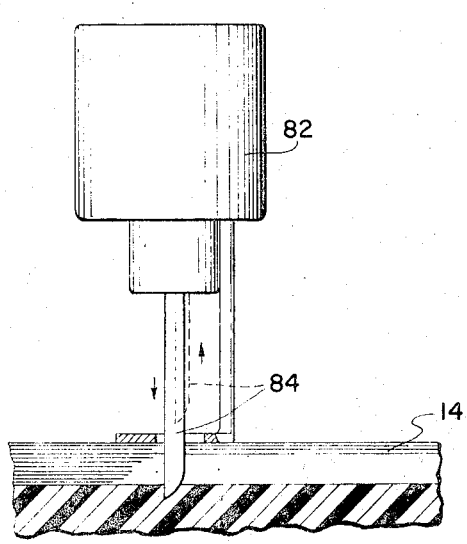
FIG. 9 is a fragmentary sectional view of a cutter used in still another embodiment of this invention.
Figure 10:
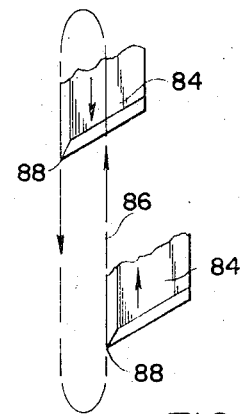
FIG. 10 is a view showing the path of movement of the cutter blade of FIG. 9 as it moves through one cycle of reciprocation.

FIGS. 9 and 10 show another embodiment of the invention. Referring to FIG. 9, the reference numeral 82 refers to a cutter which may be substituted for the cutter 36 of FIG. 1. The cutter 82 includes a reciprocating cutting tool 84 which is or may be generally similar to the blade 18 of FIG. 1. The cutter 82 is substantially similar to the cutter 36 of FIG. 1 except that instead of reciprocating the blade 84 in a straight path fixed relative to the body of the cutter, it moves the blade 84 in an orbital or similar path so that during its downstroke the blade is located forwardly of the path followed during its upstroke. In FIG. 9, the solid lines show the blade in a position occupied during one instant of its downward movement and the broken lines indicate the position of the blade during one instant of its upward stroke. FIG. 10 also shows by the line 86 the path of the point 88 of the blade 84, this path being one which is fixed relative to the remainder of the body of the cutter 82. The stroke of the cutting blade 84 of FIGS. 9 and 10 is larger than the vertical thickness of the layup 14 and is so arranged that throughout a substantial portion of its reciprocating movement, during a cutting operation, the blade is located entirely out of contact with the layup 14.

From FIGS. 9 and 10, it will be obvious that as the cutting blade 84 and cutter 82 are moved forwardly along the desired line of cut, by the apparatus of FIG. 1, the reciprocating movement of the blade is such that as the blade reaches the lowermost extent of each cycle of reciprocation it moves rearwardly relative to the cutter 82, and that as the blade reaches the upper limit of its stroke, it moves forwardly relative to the cutter 82. Combined with the general forward motion of the cutter along the desired line of cut the net effect of this will be that the blade 84 will engage a substantial previously uncut portion of the layup 14 during each downward stroke of the blade and will cut such portion in a chopping fashion. By properly selecting the length of stroke and the shape of the orbital path the cutting action may be made to be entirely of a chopping nature. Various different means well known in the art may be used to achieve the general type of path motion illustrated in FIGS. 9 and 10. The mechanisms commonly used to effect an orbital motion of the blade of a saber saw are examples of such means.

I claim:

1. An apparatus for cutting sheet material, said apparatus comprising a cutter having a cutting tool in the form of an elongated blade which reciprocates generally along its longitudinal axis when performing a cutting operation, means defining a generally horizontal upwardly facing supporting surface penetrable by said cutting tool for supporting sheet material to be cut by said cutter, means supporting said cutter so that the axis of reciprocation of said cutting tool is generally perpendicular to said supporting surface, said cutting tool having a sharpened forward cutting edge generally parallel to its longitudinal axis and also having a lower end with a generally downwardly facing cutting edge, and means for simultaneously reciprocating said cutting tool and moving it generally forwardly along a desired line of cut relative to the sheet material supported by said supporting surface, said latter means including cyclically operable means for first moving said cutting tool downwardly from a position at which said lower end thereof is adjacent the top surface of the sheet material supported by said supporting surface to a lower limit of movement at which lower limit said lower end thereof is located downwardly beyond said supporting surface, for thereafter moving said cutting tool upwardly to a point at which said lower end thereof is located above said top surface of said sheet material, and for thereafter moving said cutting tool forwardly along said line of cut while said lower end thereof is located above said top surface of said sheet material and by such a distance that when said cutting tool is again moved downwardly through said sheet material, said generally downwardly facing edge thereof encounters a previously uncut portion of said sheet material and cuts it in a chopping fashion as said downward motion takes place with said previously uncut portion being contiguous to the immediately previously cut portion so that after said previously uncut portion is cut said two portions merge to form part of a continuously cut line.

2. An apparatus as defined in claim 1 further characterized by said generally downwardly facing edge of said cutting tool extending upwardly and rearwardly from said forward edge so as to define a point located generally in line with said forward edge.

3. An apparatus as defined in claim 1 further characterized by said generally downwardly facing edge of said cutting tool extending downwardly and rearwardly from said forward edge so as to define a point located generally in line with said rear edge.

4. An apparatus as defined in claim 1 further characterized by said means for simultaneously reciprocating said cutting tool and moving it generally forwardly along a desired line of cut including means for reciprocating said cutting tool through such a path of motion that, with respect to the remainder of said cutter, said lower end of said cutting tool while moving downwardly through said sheet material supported by said supporting surface follows a path located forwardly of the path thereof followed during the movement of said cutting tool upwardly through said sheet material.

5. An apparatus as defined in claim 1 further characterized by said means for simultaneously reciprocating said cutting tool and moving it generally forwardly along a desired line of cut including a numerically controlled drive system for moving said cutter in two coordinate directions relative to said supporting surface to cause it to follow said desired line of cut and including a controller, means for reciprocating said cutting tool, and means for sensing the position of said cutting tool along its path of reciprocation, said sensing means being connected with said controller and said controller being responsive to the output of said sensing means for modifying the drive of said cutter along said desired line of cut in accordance with the position of said cutting tool along its path of reciprocation and so that said cutting tool is moved forwardly at different speeds when at different positions along its path of reciprocation.

6. An apparatus as defined in claim 5 further characterized by said controller including means for commanding movement of said cutter along said desired line of cut only when said lower end of said cutting tool is positioned above the top surface of the sheet material supported on said supporting surface.

7. An apparatus for cutting sheet material, said apparatus comprising a cutter having a cutting tool which reciprocates when performing a cutting operation, means defining a generally horizontal upwardly facing supporting surface penetrable by said cutting tool for supporting sheet material to be cut by said cutter, means supporting said cutter so that the axis of reciprocation of said cutting tool is generally perpendicular to said supporting surface, said cutting tool having a lower end with a generally downwardly facing cutting edge, a first means for reciprocating said cutting tool, and a second means operable independently of said first means for moving said cutting tool forwardly along a desired line of cut, said means for reciprocating said cutting tool being such as to move said cutting tool in substantially simple harmonic motion and through a vertical stroke which is more than twice as great as the vertical distance from said supporting surface to the top of the sheet material supported on said supporting surface, said means for supporting said cutter including means for holding said cutter at such a vertical level relative to said supporting surface during a cutting operation that said lower end of said cutting tool when in the lowermost extent of its reciprocating movement extends downwardly beyond said supporting surface by a distance which is relatively small in comparison to the vertical length of its stroke with the result that during each cycle of reciprocation said lower end of said cutting tool is located above said top surface of said sheet material for a period of time which is longer than the period of time during which said lower end of said blade is located below said top surface of said sheet material during each cycle of reciprocation with the result that while said lower end of said cutting tool is located above said top surface of said sheet material said cutting tool is moved forwardly along said line of cut so that when said cutting tool is again moved downwardly through said sheet material said generally downwardly facing edge thereof encounters a previously uncut portion of said sheet material and cuts it in a chopping fashion as said downward motion takes place.

8. An apparatus as defined in claim 7 further characterized by said means for reciprocating said cutter blade being such that the vertical length of its reciprocating stroke is at least three times greater than the vertical distance from said supporting surface to said top surface of sheet material supported on said supporting surface.

9. A method for cutting sheet material, said method comprising the steps of providing a supporting surface penetrable by a cutting tool, spreading at least one layer of sheet material over said supporting surface, providing an elongated cutting tool having a sharpened forward cutting edge generally parallel to its longitudinal axis and having one free end with an end cutting edge thereon extending generally transversely of said tool, positioning said cutting tool above the sheet material supported on said supporting surface with said end cutting edge facing generally downwardly, moving said cutting tool generally downwardly to move said end cutting edge through said sheet material and through and beyond said supporting surface, withdrawing said cutting tool from said sheet material to a point at which said end cutting edge is located above said top surface of said sheet material, moving said cutting tool forwardly along a desired line of cut while said end cutting edge is out of contact with said sheet material, thereafter again moving said cutting tool downwardly through said sheet material and through and beyond said supporting surface, and thereafter repeatedly executing in sequence said steps of with-drawing said cutting tool, moving it forwardly along the desired line of cut and moving it downwardly through said sheet material, until reaching the end of said desired line of cut, the distance by which said cutting tool is moved forwardly during each step of forward movement being such that the cut made by the subsequent downward movement of said tool merges with the cut made by the immediately preceding step of downward movement with the result that a continuously cut line is formed by the repetitive downward movements of said tool.

10. The method defined in claim 9 further characterized by the step of moving said cutting tool forwardly along said desired line of cut while said cutting tool is in the stage of being withdrawn from said sheet material, the distance by which said cutting tool is moved forwardly along said line of cut while said cutting tool is being withdrawn from said material being substantially smaller than the distance by which said cutting tool is moved forwardly along said desired line of cut while said cutting tool is out of contact with said sheet material.

11. The method defined in claim 9 further characterized by the step of holding said blade against movement in the plane of said supporting surface while executing both said step of moving said blade downwardly and said step of withdrawing said blade.

12. A method for cutting sheet material, said method comprising the steps of providing a supporting surface penetrable by a cutting tool, spreading at least one layer of sheet material over said supporting surface, providing a cutting tool having one end with a cutting edge thereon, positioning said cutting tool above the sheet material supported on said supporting surface with said cutting edge facing generally downwardly, moving said cutting tool generally downwardly to move said downwardly facing cutting edge through said sheet material and through and beyond said supporting surface, moving said cutting tool rearwardly as it reaches the lower limit of its downward movement, withdrawing said cutting tool from said sheet material to a point at which said cutting edge is located above said top surface of said sheet material, moving said cutting tool forwardly along a desired line of cut while said cutting edge is out of contact with said sheet material, thereafter again moving said cutting tool downwardly through said sheet material and through and beyond said supporting surface, and thereafter repeatedly executing in sequence said steps of moving said cutting tool rearwardly, with-drawing said cutting tool, moving it forwardly along the desired line of cut and moving it downwardly through said sheet material, until reaching the end of said desired line of cut.

* * * * *